United States Patent
Blankenship et al.

(10) Patent No.: US 11,139,910 B2
(45) Date of Patent: *Oct. 5, 2021

(54) CSI REFERENCE RESOURCE AND CQI REPORT FOR MTC OPERATION

(71) Applicant: Telefonaktiebolaget LM Ericsson (publ), Stockholm (SE)

(72) Inventors: Yufei Blankenship, Kildeer, IL (US); Robert Mark Harrison, Grapevine, TX (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 42 days.

This patent is subject to a terminal disclaimer.

(21) Appl. No.: 16/380,563

(22) Filed: Apr. 10, 2019

(65) Prior Publication Data

US 2019/0238262 A1 Aug. 1, 2019

Related U.S. Application Data

(63) Continuation of application No. 15/318,745, filed as application No. PCT/SE2016/051085 on Nov. 4, 2016, now Pat. No. 10,326,549.

(Continued)

(51) Int. Cl.
*H04L 1/00* (2006.01)
*H04L 1/08* (2006.01)
(Continued)

(52) U.S. Cl.
CPC .......... *H04L 1/0026* (2013.01); *H04L 1/0016* (2013.01); *H04L 1/0073* (2013.01);
(Continued)

(58) Field of Classification Search
CPC . H04L 1/0026; H04L 1/0073; H04L 27/2607; H04L 1/0016; H04L 1/08; H04W 72/0446
See application file for complete search history.

(56) References Cited

U.S. PATENT DOCUMENTS

| 10,326,549 B2 * | 6/2019 | Blankenship | ............. H04L 1/08 |
| 2013/0201946 A1 * | 8/2013 | Lunttila | ................ H04W 24/02 370/329 |

(Continued)

FOREIGN PATENT DOCUMENTS

| EP | 3041154 A1 | 7/2016 |
| WO | 2015030523 A1 | 3/2015 |
| WO | 2015062557 A1 | 5/2015 |

OTHER PUBLICATIONS

Samsung, "R1-155432: Link Adaptation for Low Cost UEs," 3GPP TSG RAN WG1 #82bis, Oct. 5-9, 2015, Malmo, Sweden, 5 pages.

(Continued)

*Primary Examiner* — Chi H Pham
*Assistant Examiner* — Weibin Huang
(74) *Attorney, Agent, or Firm* — Christopher & Weisberg, P.A.

(57) ABSTRACT

Systems and methods are provided for deriving channel feedback for a physical channel based on an indication of the number of transmission repetitions. In some embodiments, a method for use in a wireless device for determining channel feedback for a physical channel includes receiving control signaling including an indication of a number of transmission repetitions of the physical channel. The method also includes deriving the channel feedback for the physical channel based on the indication of the number of transmission repetitions, where a code rate corresponding to the channel feedback corresponds to an effective channel code rate of the physical channel occupying a group of physical resources including the number of transmission repetitions. In this way, the wireless device may report channel conditions that are better than the channel conditions corresponding to a single transmission, according to some embodiments.

20 Claims, 11 Drawing Sheets

Related U.S. Application Data

(60) Provisional application No. 62/252,224, filed on Nov. 6, 2015.

(51) Int. Cl.
*H04L 27/26* (2006.01)
*H04W 72/04* (2009.01)

(52) U.S. Cl.
CPC ............ *H04L 1/08* (2013.01); *H04L 27/2607* (2013.01); *H04W 72/0446* (2013.01)

(56) References Cited

U.S. PATENT DOCUMENTS

| | | | | |
|---|---|---|---|---|
| 2016/0057693 | A1* | 2/2016 | Nagata | H04W 48/14 370/254 |
| 2016/0105264 | A1 | 4/2016 | Chen et al. | |
| 2016/0112997 | A1* | 4/2016 | Chen | H04L 5/0087 370/329 |
| 2016/0219587 | A1* | 7/2016 | Lin | H04L 5/0044 |
| 2016/0269146 | A1* | 9/2016 | Sun | H04L 1/20 |
| 2016/0285535 | A1* | 9/2016 | Kim | H04L 1/1671 |
| 2016/0345314 | A1* | 11/2016 | Webb | H04W 52/146 |
| 2017/0288808 | A1 | 10/2017 | Blankenship et al. | |

OTHER PUBLICATIONS

Examination Report for European Patent Application No. 16795457.7, dated Aug. 14, 2019, 7 pages.
Author Unknown, "Technical Specification Group Radio Access Network; Evolved Universal Terrestrial Radio Access (E-UTRA); Physical channels and modulation (Release 12)," Technical Specification 36.211, Version 12.7.0, 3GPP Organizational Partners, Sep. 2015, 136 pages.
Author Unknown, "Technical Specification Group Radio Access Network; Evolved Universal Terrestrial Radio Access (E-UTRA); Physical channels and modulation (Release 13)," Technical Specification 36.211, Version 13.2.0, 3GPP Organizational Partners, Jun. 2016, 168 pages.
Author Unknown, "Technical Specification Group Radio Access Network; Evolved Universal Terrestrial Radio Access (E-UTRA); Physical layer procedures (Release 12)," Technical Specification 36.213, Version 12.4.0, 3GPP Organizational Partners, Dec. 2014, 225 pages.
Author Unknown, "Technical Specification Group Radio Access Network; Evolved Universal Terrestrial Radio Access (E-UTRA); Physical layer procedures (Release 12)," Technical Specification 36.213, Version 12.7.0, 3GPP Organizational Partners, Sep. 2015, 241 pages.
Author Unknown, "Technical Specification Group Radio Access Network; Evolved Universal Terrestrial Radio Access (E-UTRA); Physical layer procedures (Release 13)," Technical Specification 36.213, Version 13.2.0, 3GPP Organizational Partners, Jun. 2016, 381 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.7.0, 3GPP Organizational Partners, Sep. 2015, 453 pages.
Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.1.0, 3GPP Organizational Partners, Mar. 2016, 551 pages.
Ericsson, "R1-144563: SIB transmission for MTC," 3rd Generation Partnership Project (3GPP), TSG-RAN WG1 Meeting #79, Nov. 17-21, 2014, 7 pages, San Francisco, USA.
Ericsson, "R1-156418: UCI definition for MTC," 3rd Generation Partnership Project (3GPP), TSG RAN WG1 Meeting #83, Nov. 15-22, 2015, 6 pages, Anaheim, USA.
Ericsson, "RP-150492: Revised WI: Further LTE Physical Layer Enhancements for MTC," 3rd Generation Partnership Project (3GPP), Work Item, TSG RAN Meeting #67, Mar. 9-12, 2015, 9 pages, Shanghai, China.
Non-Final Office Action for U.S. Appl. No. 15/318,745, dated Apr. 6, 2018, 13 pages.
Final Office Action for U.S. Appl. No. 15/318,745, dated Sep. 28, 2018, 14 pages.
Advisory Action, Interview Summary, and AFCP 2.0 Decision for U.S. Appl. No. 15/318,745, dated Jan. 2, 2019, 7 pages.
Notice of Allowance for U.S. Appl. No. 15/318,745, dated Feb. 6, 2019, 7 pages.
International Search Report and Written Opinion for International Patent Application No. PCT/SE2016/051085, dated Jan. 30, 2017, 13 pages.
Ericsson, "R1-150024: CSI range and format for MTC," 3rd Generation Partnership Project (3GPP), TSG RAN WG1 Meeting #80, Feb. 9-13, 2015, 6 pages, Athens, Greece.

\* cited by examiner

US 11,139,910 B2

CSI REFERENCE RESOURCE AND CQI REPORT FOR MTC OPERATION

RELATED APPLICATIONS

This application is a continuation of U.S. patent application Ser. No. 15/318,745, filed Dec. 14, 2016, which is a 35 U.S.C. § 371 national phase filing of International Application No. PCT/SE2016/051085, now U.S. Pat. No. 10,326, 549, filed Nov. 4, 2016, which claims the benefit of U.S. Provisional Application No. 62/252,224, filed Nov. 6, 2015, the disclosures of which are incorporated herein by reference in their entireties.

TECHNICAL FIELD

The present disclosure relates to a method for defining a Channel State Information (CSI) reference resource and a Channel Quality Indicator (CQI) reporting table.

BACKGROUND

Long Term Evolution (LTE) uses Orthogonal Frequency Division Multiplexing (OFDM) in a downlink and Discrete Fourier Transform (DFT)-spread OFDM in an uplink. The basic LTE downlink physical resource can thus be seen as a time-frequency grid as illustrated in FIG. 1, where each resource element corresponds to one OFDM subcarrier during one OFDM symbol interval.

In a time domain, LTE downlink transmissions are organized into radio frames of 10 ms, as shown in FIG. 2, each radio frame consisting of ten equally-sized subframes of length $T_{subframe}$=1 ms.

Internet of Things (IoT) and the related concept of Machine-Type Communication (MTC) are important revenue streams for operators and have huge potential from an operator perspective. It is efficient for operators to be able to serve MTC User Equipments (UEs) using already deployed radio access technology. Therefore, $3^{rd}$ Generation Partnership Project (3GPP) LTE has been investigated as a competitive radio access technology for efficient support of MTC. Lowering the cost of MTC UEs is an important enabler for implementation of the IoT. Many MTC applications will require low operational UE power consumption and are expected to communicate with infrequent bursty transmissions and small-size data packets. In addition, there is a substantial market for Machine-to-Machine (M2M) use cases of devices deployed deep inside buildings which would require coverage enhancement in comparison to a defined LTE cell coverage footprint.

3GPP LTE Rel-12 has defined a UE power saving mode allowing long battery lifetime and a new UE category allowing reduced modem complexity. In Rel-13, further MTC work is expected to further reduce UE cost and provide coverage enhancement. The key element to enable cost reduction is to introduce reduced UE bandwidth of 1.4 MHz in downlink and uplink within any system bandwidth. As such, systems and methods are needed for determining Channel State Information (CSI) reference resources and Channel Quality Indicator (CQI) reporting for MTC operation when the UE is limited to only 1.4 MHz of bandwidth.

SUMMARY

Systems and methods are provided for deriving channel feedback for a physical channel based on an indication of the number of transmission repetitions. In some embodiments, a method for use in a wireless device for determining channel feedback for a physical channel includes receiving control signaling, such as receiving a control signal, including an indication of a number of transmission repetitions of the physical channel. The method also includes deriving the channel feedback for the physical channel based on the indication of the number of transmission repetitions, where a code rate corresponding to the channel feedback corresponds to an effective channel code rate of the physical channel occupying a group of physical resources including the number of transmission repetitions. In this way, the wireless device may report channel conditions that are better than the channel conditions corresponding to a single transmission, according to some embodiments.

In some embodiments, the method further includes reporting the channel feedback for the physical channel. In some embodiments, the channel feedback is a Channel State Information (CSI) feedback, a Channel Quality Indication (CQI), and/or a CSI feedback comprising a CQI. In some embodiments, the group of physical resources is termed a CSI reference resource, wherein the CSI reference resource occupies a plurality of subframes.

In some embodiments, the method further includes receiving control signaling including an indication of a frequency hopping pattern of the physical channel and deriving the channel feedback for the physical channel includes deriving the channel feedback for the physical channel assuming that the frequency hopping pattern is used. In some embodiments, the frequency hopping pattern identifies a set of Physical Resource Blocks (PRBs) that the physical channel will occupy if the physical channel is transmitted in a first subframe, the set of PRBs is contiguous in frequency, and the set of PRBs is different if the physical channel is transmitted in a second subframe.

In some embodiments, the CSI feedback comprises a CQI index selected from a group of CQI indices, where each of the CQI indices is associated with the number of transmission repetitions of the physical channel.

In some embodiments, the group of CQI indices composes a first CQI definition table for the number of transmission repetitions of the physical channel and a second CQI definition table comprises a second plurality of CQI indices for a second number of transmission repetitions of the physical channel.

In some embodiments, the number of transmission repetitions of the physical channel is not applicable to a Machine-Type Communication (MTC) User Equipment (UE) in Coverage Enhancement (CE) mode B, but can be configured for a UE in CE mode A.

In some embodiments, the transmission repetitions of the physical channel are transmitted over subframes in a first CSI subframe set, where the transmission repetitions skip subframes not in the first CSI subframe set.

In some embodiments, the group of physical resources is a 6-PRB narrowband in a subframe that is also used for MTC Physical Downlink Control Channel, M-PDCCH, monitoring and/or the physical channel reception.

In some embodiments, the number of transmission repetitions of the physical channel is fixed for all CQI values in the group of CQI indices.

In some embodiments, the value of the number of transmission repetitions is signaled in a dedicated manner. In some embodiments, the physical channel is a Physical Downlink Shared Channel (PDSCH) or a Physical Downlink Control Channel (PDCCH).

Some embodiments provide mechanisms to allow CQI reporting to take into account Physical Downlink Shared Channel (PDSCH) repetitions. Channel Quality Indicator (CQI) reference resource definitions are expanded to include PDSCH transmission across multiple subframes. CQI reporting assumes a reference number of repetitions and can indicate a preferred number of repetitions.

Some embodiments provide CQI reporting for different MTC UE operating modes. This provides better link adaptation and therefore better system throughput.

In some embodiments, a method of determining Channel State Information (CSI) feedback for a physical channel, such as a range extended physical channel, includes receiving control signaling identifying at least one number of transmission repetitions, the at least one number of transmission repetitions identifying a number of repetitions that the physical channel will be transmitted with if the physical channel is transmitted; and deriving CSI feedback that satisfies the condition that the physical channel occupies a group of physical resources termed a CSI reference resource, wherein the CSI reference resource occupies a plurality of LTE subframes. It also includes deriving the channel feedback for the physical channel based on the indication of the number of transmission repetitions, where a code rate corresponding to the channel feedback corresponds to an effective channel code rate of the physical channel occupying a group of physical resources comprising the number of transmission repetitions.

In some embodiments, a method of determining CSI feedback includes receiving control signaling identifying at least one number of transmission repetitions, the at least one number of transmission repetitions identifying a number of repetitions that the physical channel will be transmitted with if the physical channel is transmitted; determining a plurality of CQI indices, where each of the plurality of CQI indices is associated with the number of transmission repetitions; and determining a CQI index from the plurality of CQI indices to use as CSI feedback.

In some embodiments, a method for use in a wireless device for determining channel feedback for a channel includes determining feedback for the channel over two or more subframes.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any two or more embodiments described below may be combined in any way with each other.

In some embodiments, a non-limiting term User Equipment device (UE) is used. The UE herein can be any type of wireless device capable of communicating with a network node or another UE over radio signals. The UE may also be a radio communication device, a target device, a Device-to-Device (D2D) UE, a machine type UE, a UE capable of Machine-to-Machine (M2M) communication, a sensor equipped with a UE, an iPad, a tablet, a mobile terminal, a smart phone, Laptop Embedded Equipment (LEE), Laptop Mounted Equipment (LME), Universal Serial Bus (USB) dongles, Customer Premises Equipment (CPE), etc.

Also in some embodiments, generic terminology, "radio network node" or simply "network node," is used. This can refer to any kind of network node which may be comprised of a base station, a radio base station, a base transceiver station, a base station controller, a network controller, an enhanced or evolved Node B (eNB), a Node B, Multi-cell/Multicast Coordination Entity (MCE), a relay node, an access point, a radio access point, a Remote Radio Unit (RRU) Remote Radio Head (RRH), a core network node (e.g., a Trace Collection Entity (TCE), a Mobility Management Entity (MME), a Minimization of Drive Tests (MDT) node, a Multimedia Broadcast/Multicast Service (MBMS) node), or even an external node (e.g., a third party node, a node external to the current network), etc.

Figure 1:
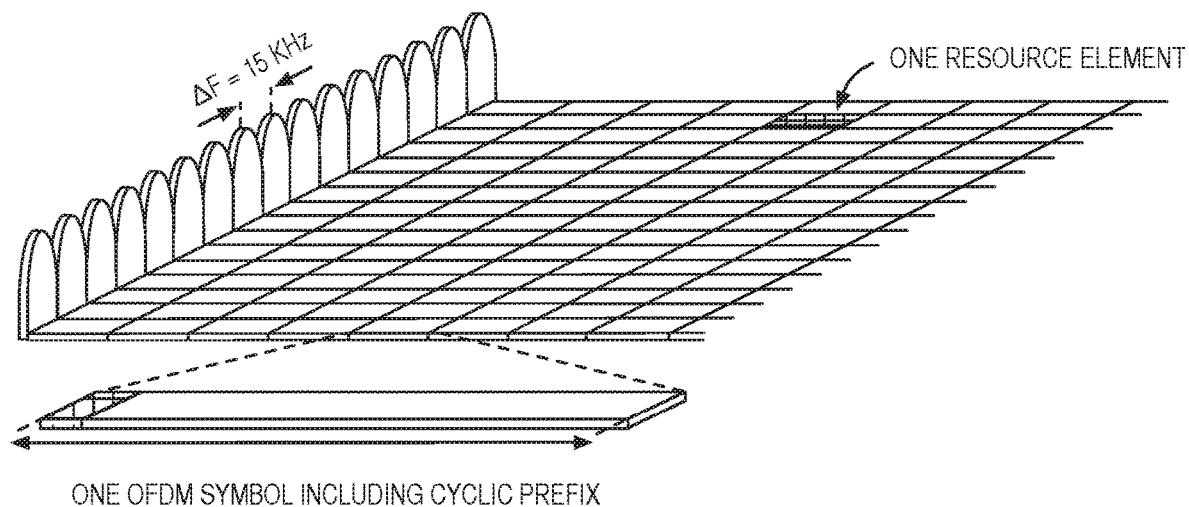
FIG. 1 illustrates a Long Term Evolution (LTE) downlink physical resource.
Figure 2:
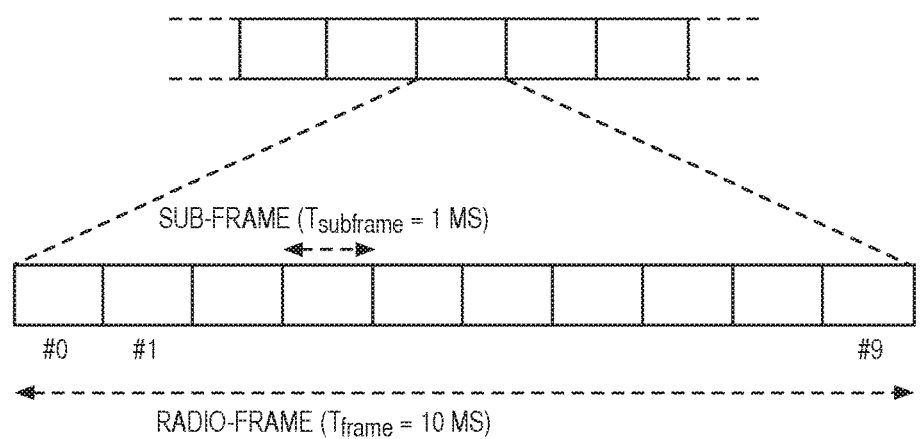
FIG. 2 illustrates an LTE time-domain structure.
Figure 3:
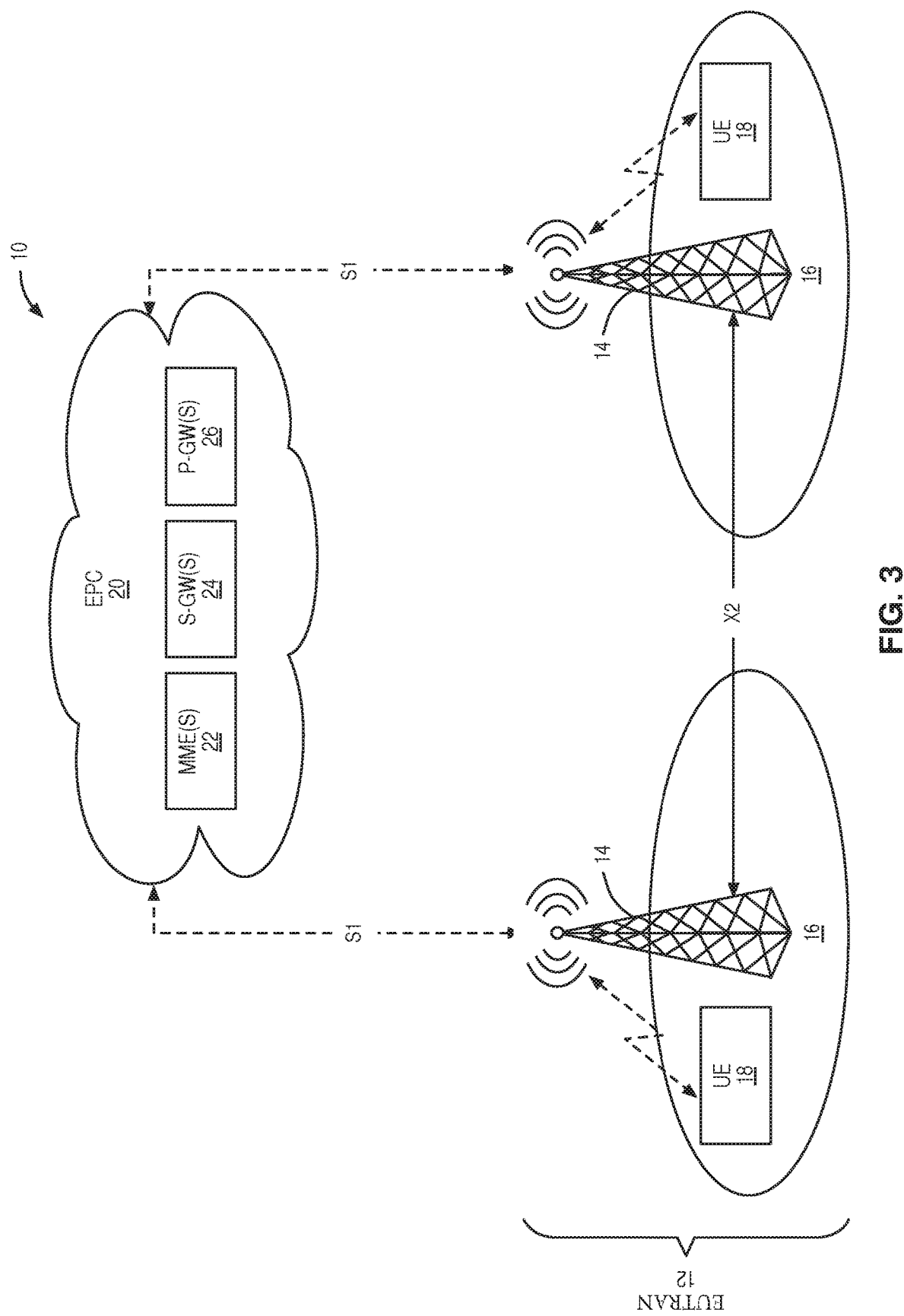
FIG. 3 illustrates one example of a cellular communications network.

FIG. 3 illustrates one example of a cellular communications network 10 in which embodiments of the present disclosure can be implemented. As illustrated, the cellular communications network 10 includes a Radio Access Network (RAN) 12 (e.g., an Evolved Universal Mobile Telecommunications System (UMTS) Radio Access Network (E-UTRAN) for Long Term Evolution (LTE)) including network nodes 14 (e.g., base stations) providing cells 16 of the cellular communications network 10. The network nodes 14 provide radio access to UEs 18 located within the respective cells 16. The network nodes 14 may be communicatively coupled via a base station to base station interface (e.g., an X2 interface in LTE). Further, the network nodes 14 are connected to a core network 20 (e.g., an Evolved Packet Core (EPC) in LTE) via corresponding interfaces (e.g., S1 interfaces in LTE). The core network 20 includes various core network nodes such as, e.g., MMEs 22, Serving Gateways (S-GWs) 24, and Packet Data Network (PDN) Gateways (P-GWs) 26, as will be appreciated by one of ordinary skill in the art. Throughout this disclosure, the UE 18 is a Machine-Type Communication (MTC) device or MTC UE.

In LTE, the system bandwidth can be up to 20 MHz, and this total bandwidth is divided into physical resource blocks (PRBs) of 180 kHz. The low-complexity UEs with reduced UE bandwidth of 1.4 MHz that will be introduced in LTE Rel-13 will only be able to receive a part of the total system bandwidth at a time—a part corresponding to up to 6 PRBs. Here a group of 6 PRBs is referred to as a "PRB group".

In order to achieve the coverage targeted in LTE Rel-13 for low-complexity UEs and other UEs operating delay tolerant MTC applications, time repetition techniques will be used in order to allow energy accumulation of the received signals at the UE side. For physical data channels (Physical Downlink Shared Channel (PDSCH), Physical Uplink Shared Channel (PUSCH)), subframe bundling (a.k.a. Transmission Time Interval (TTI) bundling) can be used. When subframe bundling is applied, each Hybrid Automatic Repeat Request (HARQ) (re)transmission consists of a bundle of multiple subframes instead of just a single subframe. Repetition over multiple subframes can also be applied to physical control channels. Depending on a UE's coverage situation, a different number of repetitions will be used.

The Channel Quality Indicator (CQI) indices and their interpretations are given in Table 7.2.3-1 of TS 36.213 for reporting CQI based on Quadrature Phase Shift Keying (QPSK), 16 Quadrature Amplitude Modulation (QAM) and 64QAM.

Based on an unrestricted observation interval in time and frequency, the UE shall derive for each CQI value reported in uplink subframe n the highest CQI index between 1 and 15 in Table 7.2.3-1 or Table 7.2.3-2 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the Channel State Information (CSI) reference resource, could be received with a transport block error probability not exceeding 0.1.

TABLE 1

4-bit CQI Table (TS36.213 V12.4.0, Table 7.2.3-1)

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

For MTC operation, the CSI reference resource is no longer sufficient and needs to be modified. Furthermore, the CQI table needs to be modified in order to allow the UE to indicate a number of PDSCH repetitions that best match channel conditions.

The Rel-13 MTC UE operates in Coverage Enhancement (CE) level mode A or CE mode B. For Rel-13 Low-Complexity/Coverage Enhancement (LC/CE) UEs, the CQI indices and their interpretations are given in a CQI definition table for reporting CQI based on QPSK, 16QAM. In one embodiment, one CQI definition table can be made for CE mode A, while another table is made for CE mode B. In another embodiment, one CQI definition table is the table for each CE level, including a CQI table for no coverage enhancement. In the following, the discussion assumes the embodiment of one CQI table for each CE mode.

Based on an unrestricted observation interval in time and frequency, the UE shall derive for each CQI value reported in uplink subframe n the highest CQI index between 1 and 15 in the CQI table of the UE's operating CE mode (i.e., either CE mode A or CE mode B), or CQI index 0 if CQI index 1 does not satisfy the condition:

A single PDSCH transport block with a combination of modulation scheme and transport block size corresponding to the CQI index, and occupying a group of downlink physical resource blocks in one or more subframes termed the CSI reference resource, could be received with a transport block error probability not exceeding a target block error rate. In one example, the target block error rate is 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets are configured by higher layers, a UE is not expected to receive a trigger for which the CSI reference resource is in a subframe that does not belong to either subframe set. In some embodiments, one CSI subframe set corresponds to a set of 'valid' subframes while the other CSI subframe set corresponds to a set of 'invalid' subframes. In this way, the set of 'valid' (hence 'invalid') subframes may be signaled via higher layer signaling.

In some embodiments, the CSI subframe sets are not applicable to an MTC UE. Hence the UE does not differentiate the channel condition of two different subframe sets due to their different interference level. This is useful for UEs whose PDSCH transmission requires repetitions across multiple consecutive valid DL subframes.

In some embodiments, the CSI subframe sets are not applicable to MTC UE in CE mode B, but can be configured for UE in CE mode A.

In some embodiments, the eNB transmits repetitions of a PDSCH transport over both CSI subframe sets $C_{CSI,0}$ and $C_{CSI,1}$. At the receiving side, the UE processes repetitions over sets $C_{CSI,0}$ and $C_{CSI,1}$ differently, taking into account the different interference condition of the two sets.

In some embodiments, the repetitions of a given PDSCH transport are transmitted over subframes in a first CSI subframe set, where the repetitions skip the subframes in the other subframe set (i.e., the repetition is delayed to next available subframe in the first CSI subframe set).

A UE may be configured to receive a PDSCH that is repeated over multiple subframes. The number of repetitions of the PDSCH in the CSI reference resource may be termed the "repetition level", $R_{ref}$. Rref is sometimes referred to herein as an indication of a number of transmission repetitions of the physical channel. Note that $R_{ref}$ may vary according to the Modulation and Coding Scheme (MCS) state, as described below. In some embodiments, a combination of a repetition level $R_{ref}$, modulation scheme, and transport block size corresponds to a CQI index if:
the combination could be signaled for transmission on the PDSCH in the CSI reference resource according to the relevant Transport Block Size table, and
the modulation scheme is indicated by the CQI index, and
the combination of repetition level $R_{ref}$, transport block size and modulation scheme when applied to the reference resource results in the effective channel code rate which is the closest possible to the code rate indicated by the CQI index. If more than one combination of repetition level $R_{ref}$, transport block size and modulation scheme results in an effective channel code rate equally close to the code rate indicated by the CQI index, only the combination with the smallest of such transport block sizes is relevant. Here the effective channel code rate $CR_{eff}$ means a transport block is effectively mapped to a block of code bits with code rate $CR_{eff}$, and then transmitted over $R_{ref}$ subframes via $R_{ref}$ repetitions of the code bits (i.e., the effective code rate does not include the $R_{ref}$ repetitions). Here 'repetition' includes simple repetition, as well as transmitting different sets of code bits associated with the same transport block (e.g., redundancy version cycling).

Figure 4:
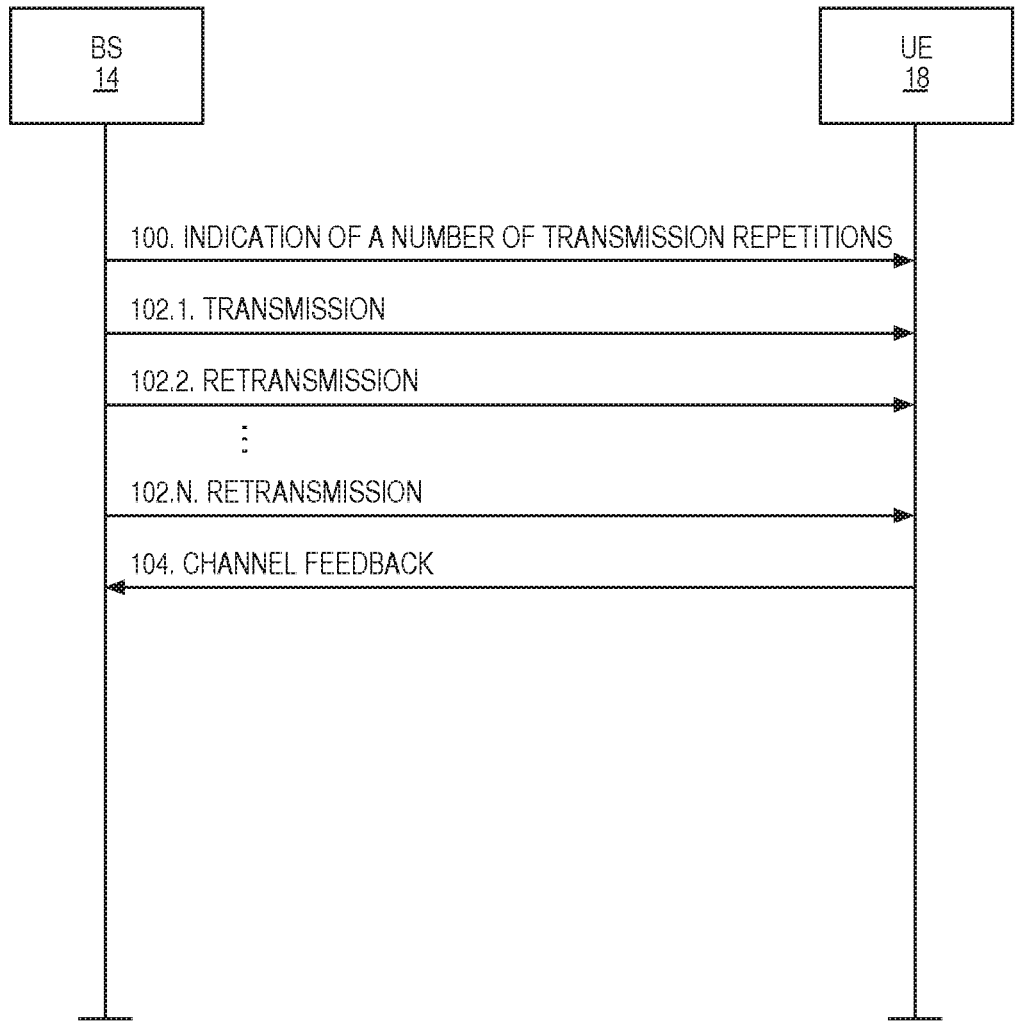
FIG. 4 is a flow chart illustrating the operation of a User Equipment (UE) for receiving a number of transmission repetitions and providing channel feedback according to some embodiments of the present disclosure.

FIG. 4 is a flow chart illustrating the operation of a UE 18 for receiving a number of transmission repetitions and providing channel feedback according to some embodiments of the present disclosure. As illustrated, a network node 14 (e.g., a base station) sends and a UE 18 receives an indication of a number of transmission repetitions (step 100). The network node 14 then sends a first transmission (step 102.1), a retransmission (step 102.2) and so on until the correct number of transmission repetitions has been reached (step 102.N). The UE 18 then sends channel feedback to the network node 14 (step 104).

In some embodiments, the CSI reference resource for a serving cell is defined as follows:
In the frequency domain, the CSI reference resource is defined by the group of downlink physical resource blocks corresponding to the band to which the derived CQI value relates.
In the time domain, for a UE 18 configured in transmission mode 1-9 with a single configured CSI process for the serving cell, the CSI reference resource is defined by a set of $R_{ref}$ consecutive valid downlink or special subframes where the last subframe of the CSI reference resource has index n-$n_{CQI\_ref}$, where $n_{CQI\_ref}$ is as defined in TS 36.213.

In the CSI reference resource, the low-cost and/or coverage-enhancement UE 18 shall assume one or more of the following for the purpose of deriving the CQI index, and if also configured, Precoding Matrix Index (PMI):
Frequency hopping is enabled or disabled according to higher layer signaling. The CSI reference resource in each valid downlink subframe or special subframe is composed of a narrowband of fixed size, regardless of the system bandwidth. In one example, the narrowband is a 6-PRB narrowband, and narrowband of this size is assumed in the rest of the discussion.
If frequency hopping is enabled, the 6-PRB narrowband may change according to a predefined frequency hopping pattern. In some embodiments, the predefined frequency hopping pattern is that of MTC Physical Downlink Control Channel (M-PDCCH), following which UE 18 monitors the M-PDCCH. Alternatively, the predefined frequency hopping pattern is that of PDSCH.
If frequency hopping is disabled, the 6-PRB narrowband stays the same across the subframes in the CSI reference resource. In some embodiments, the 6-PRB narrowband location is that of M-PDCCH, where the UE 18 monitors the M-PDCCH. Alternatively, the 6-PRB narrowband location is that of PDSCH.
No resource elements are used by primary or secondary synchronization signals or Physical Broadcast Channel (PBCH), Enhanced Physical Downlink Control Channel (EPDCCH), or M-PDCCH.
For TM9, if the UE 18 is configured with PMI reporting and the number of CSI-RS ports is greater than 1, the precoding matrix may vary from one set of X subframes to another set of X subframes. The same precoding matrix is assumed per antenna port at least on the same PRB for at least X consecutive subframes, where X is an integer. A typical value of X is 4 subframes.
Redundancy Version (RV) cycling is applied when the CSI reference resource spans multiple subframes. In some embodiments, the RV cycling follows the predefined pattern of {0,2,3,1}. The same RV is used for at least Z consecutive subframes before changing to another RV value. A typical value of Z is 4 subframes.

Figure 5:
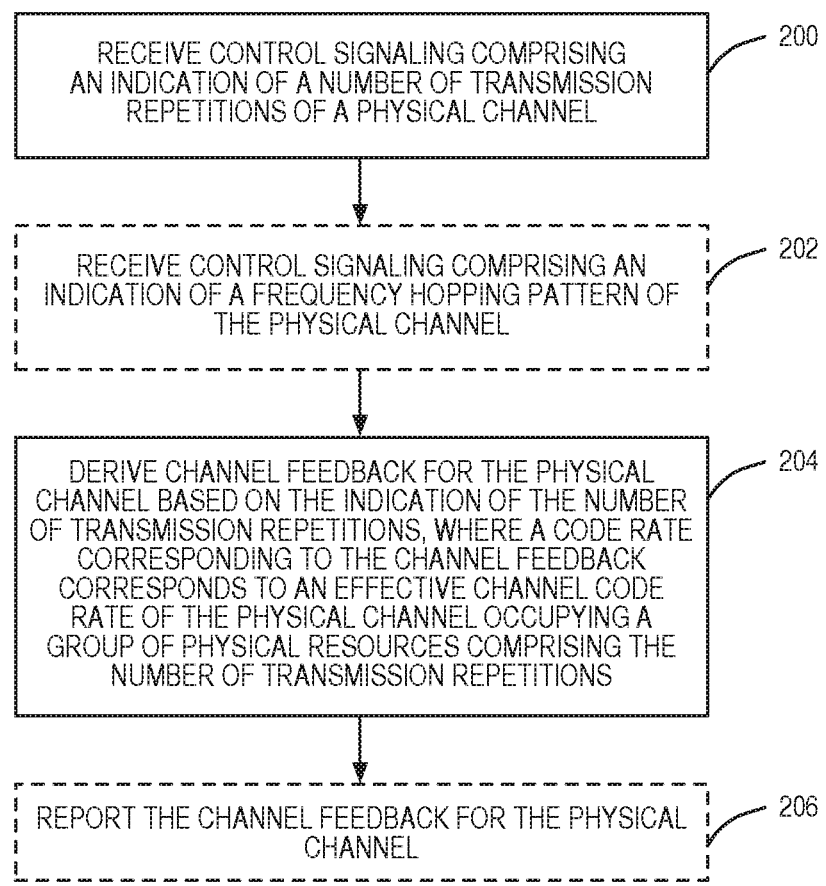
FIG. 5 is a flow chart illustrating a UE deriving channel feedback based on an indication of the number of transmission repetitions according to some embodiments of the present disclosure.

FIG. 5 is a flow chart illustrating a UE 18 deriving channel feedback based on an indication of the number of transmission repetitions according to some embodiments of the present disclosure. First, the UE 18 receives control signaling, such as receiving a control signal, comprising an indication of a number of transmission repetitions of a physical channel (step 200). Optionally, the UE 18 may receive control signaling comprising an indication of a frequency hopping pattern of the physical channel (step 202).

Then the UE 18 derives CSI feedback for the physical channel based on the indication of the number of transmission repetitions (step 204). In some embodiments, a code rate corresponding to the channel feedback corresponds to an effective channel code rate of the physical channel occupying a group of physical resources comprising the number of transmission repetitions. Optionally, the UE 18 may report the channel feedback for the physical channel (step 206).

Figure 6:
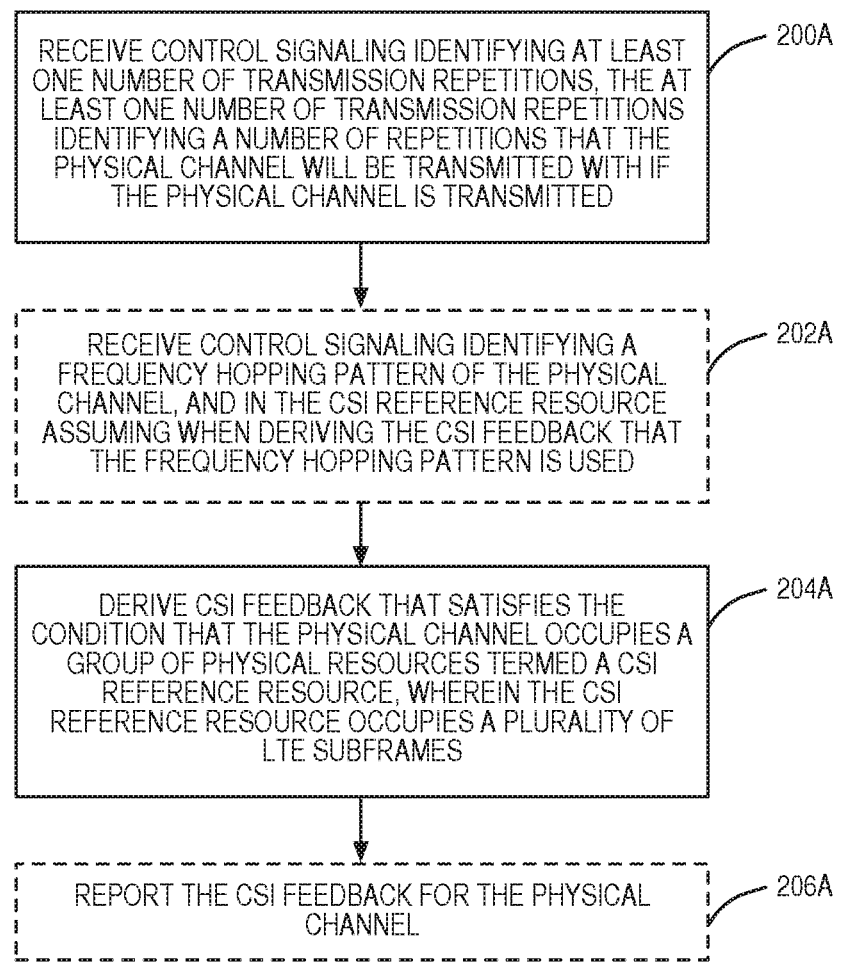
FIG. 6 is a flow chart illustrating the operation of a UE determining a Channel State Information (CSI) reference resource according to some embodiments of the present disclosure.

FIG. 6 is a flow chart illustrating the operation of a UE 18 for determining a CSI reference resource according to some embodiments of the present disclosure. First, the UE 18 receives control signaling identifying at least one number of transmission repetitions. In some embodiments, the at least one number of transmission repetitions identifies a number of repetitions that the physical channel will be transmitted with if the physical channel is transmitted (step 200A). Optionally, the UE 18 may receive control signaling identifying a frequency hopping pattern of the physical channel, and in the CSI reference resource assuming when deriving the CSI feedback that the frequency hopping pattern is used (step 202A).

Then the UE 18 derives CSI feedback that satisfies the condition that the physical channel occupies a group of physical resources. In some embodiments, this group of physical resources is termed a CSI reference resource, wherein the CSI reference resource occupies a plurality of LTE subframes (step 204A). In some embodiments, feedback that satisfies the condition that the physical channel occupies a group of physical resources is feedback where a code rate corresponding to the channel feedback corresponds to an effective channel code rate of the physical channel occupying a group of physical resources comprising the number of transmission repetitions. Also, although this step refers to CSI feedback, this channel feedback can include a CSI feedback, a CQI, or CSI comprising CQI. Optionally, the UE 18 may report the CSI feedback for the physical channel (step 206A).

In addition to the embodiments discussed in relation to FIG. 6, in some embodiments, a method for use in a wireless device for determining channel feedback for a channel includes determining feedback for the channel over two or more (i.e., multiple) subframes. In some embodiments, the feedback is related to several subframes. In some embodiments, the number of subframes is based on a number of transmission repetitions received by the device. In some embodiments, the number of repetitions is received from the network. In some embodiments, the number of repetitions is received from the network through control signaling. In some embodiments, the channel feedback is CSI, CQI or CSI comprising CQI. In some embodiments, the channel is PDSCH and/or PDCCH.

Also, additional embodiments that relate to the embodiments discussed in relation to FIG. 6 are included below in Appendices A and B. In some embodiments, the UE 18 uses a 6-PRB narrowband in a subframe for its reference resource, and the UE 18 uses the same 6 PRBs in the subframe for M-PDCCH monitoring and/or PDSCH reception. In other embodiments, the location of the 6-PRB narrowband is specifically defined for channel measurement purpose, for example, that associated with a measurement gap.

TABLE 2

TS 36.213, Table 7.2.3-0: PDSCH transmission scheme assumed for CSI reference resource

| Transmission mode | Transmission scheme of PDSCH |
|---|---|
| 1 | Single-antenna port, port 0 |
| 2 | Transmit diversity |
| 6 | Closed-loop spatial multiplexing with a single transmission layer |
| 9 | If the UE is configured without PMI/RI reporting: if the number of PBCH antenna ports is one, single-antenna port, port 0; otherwise transmit diversity If the UE is configured with PMI reporting: if the number of CSI-RS ports is one, single-antenna port, |

TABLE 2-continued

TS 36.213, Table 7.2.3-0: PDSCH transmission scheme assumed for CSI reference resource

| Transmission mode | Transmission scheme of PDSCH |
|---|---|
| | port 7; otherwise 1 layer transmission, ports 7-14 (see subclause 7.1.5B) |

In some embodiments, the PDSCH may be repeated a variable number of times. In such an embodiment, the UE 18 receives a semi-dynamic higher-layer information element PDSCH-Rep-List indicating a number of different repetition levels with which the PDSCH may be transmitted and an indication in Downlink Control Information (DCI) dynamically indicating the number of repetitions used for the corresponding PDSCH.

For CE mode A, no repetitions or a small number of repetitions are expected. Let the set of repetitions associated with CE mode A, and signaled by PDSCH-Rep-List, be: $R_{set,A}=\{R_{0,A}, R_{1,A}, R_{2,A}, \ldots R_{n,A}\}$. It is expected that $R_{0,A}=1$. One example is n=4, $R_{set,A}=\{1,2,4,8\}$. Another example is n=8, $R_{set,A}=\{1,2,4,6,8,12,16,24\}$.

For CE mode B, a medium to large number of repetitions are expected. Let the set of repetitions associated with CE mode B, and signaled by PDSCH-Rep-List, be: $R_{set,B}=\{R_{0,B}, R_{1,B}, R_{2,B}, \ldots R_{m,B}\}$. One example is m=4, $R_{set,A}=\{8,16,32,64\}$. Another example is m=8, $R_{set,B}=\{24, 32,48,64,96,128,192,256\}$.

In some embodiments, the value of $R_{ref}$ can be fixed for all CQI values in the CQI table. Alternatively, $R_{ref}$ may vary according to the CQI values in the CQI table, as discussed in the section below.

Denote the set of repetitions associated with CE mode configured to the UE 18 and to be reported in CQI as $\{R_0, R_1, R_2, \ldots\}$. Define a reference number of repetitions for CQI as $R_{CQI}$. $R_{CQI}$ stays the same for all entries in the CQI table. For some CQI entries, the UE 18 assumes that the number of repetitions, $R_{ref}$, to be used to calculate a given CQI index is $R_{CQI}$, in which case $R_{ref}=R_{CQI}$. Otherwise, if the UE 18 assumes the CQI entry is associated with a different number of repetitions, $R_{ref}$, then $R_{CQI}$, then $R_{ref} \neq R_{CQI}$ is sometimes referred to herein as an indication of a number of transmission repetitions of the physical channel. The number of transmission repetitions in the CSI reference resource could thus be termed repetition level, $R_{ref}$, and the $R_{ref}$ used for CQI index calculations be termed $R_{CQI}$.

In some embodiments, the value of $R_{CQI}$ can be:

An implicitly defined value that requires no additional signaling such as:
  A minimum number of repetitions in the repetition set associated with UE's CE mode, i.e., $R_{0,A}$ for CE mode A, $R_{0,B}$ for CE mode B.
  A maximum number of repetitions in the repetition set associated with UE's CE mode, i.e., $R_{n,A}$ for CE mode A, $R_{m,B}$ for CE mode B.
  A value in the middle of the repetition set associated with UE's CE mode;
  The repetition level $R_{ref}$ associated with CSI reference resource, if $R_{ref}$ is not one of the values above (i.e., min, max, or middle value of the repetition set);
A value signalled in a dedicated manner.

Figure 7:
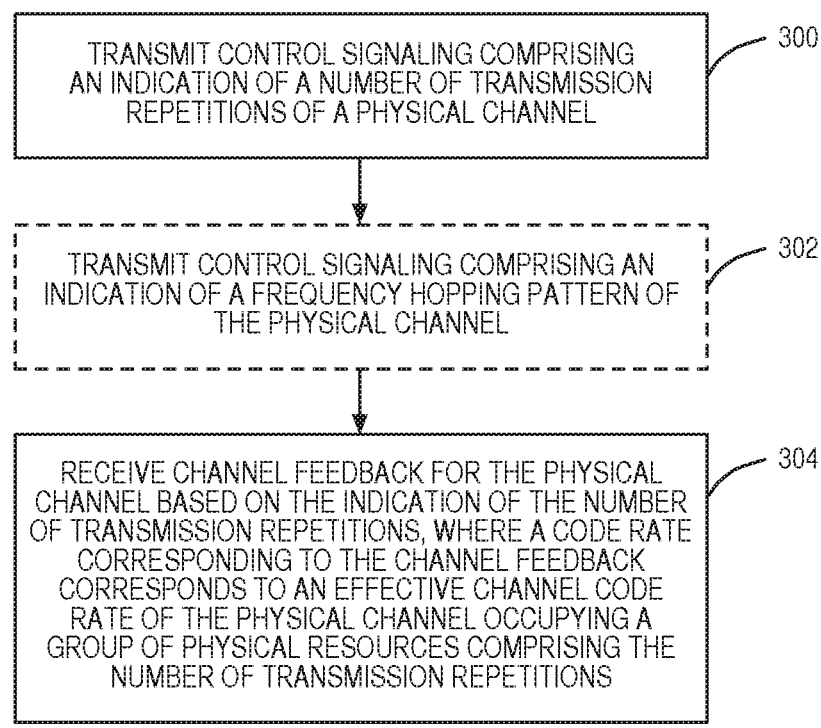
FIG. 7 is a flow chart illustrating the operation of a network node for transmitting an indication of a number of transmission repetitions according to some embodiments of the present disclosure.

FIG. 7 is a flow chart illustrating the operation of a network node 14 for transmitting an indication of a number of transmission repetitions according to some embodiments of the present disclosure. The network node 14 transmits control signaling comprising an indication of a number of transmission repetitions of a physical channel (step 300). As discussed above, the network node 14 may optionally transmit control signaling comprising an indication of a frequency hopping pattern of the physical channel (step 302). As shown in FIG. 7, the network node 14 then receives channel feedback for the physical channel based on the indication of the number of transmission repetitions (step 304). In some embodiments, the code rate corresponding to the channel feedback corresponds to an effective channel code rate of the physical channel occupying the group of physical resources comprising the number of transmission repetitions.

Figure 8:
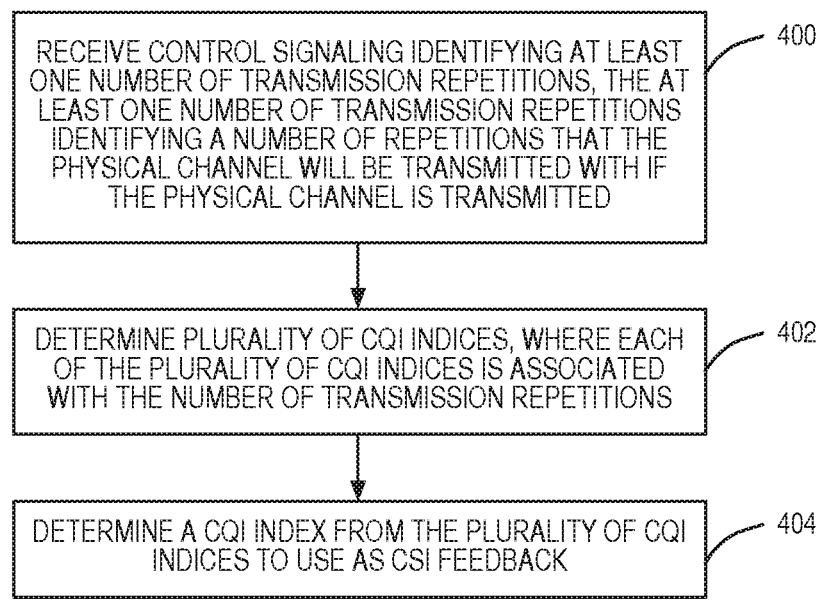
FIG. 8 is a flow chart illustrating the operation of a UE for determining a plurality of Channel Quality Indicator (CQI) indices associated with the number of transmission repetitions according to some embodiments of the present disclosure.

FIG. 8 is a flow chart illustrating the operation of a UE 18 for determining a plurality of CQI indices associated with the number of transmission repetitions according to some embodiments of the present disclosure. First, the UE 18 receives control signaling identifying at least one number of transmission repetitions, the at least one number of transmission repetitions identifying a number of repetitions that the physical channel will be transmitted with if the physical channel is transmitted (step 400). Then the UE 18 determines a plurality of CQI indices, where each of the plurality of CQI indices is associated with the number of transmission repetitions (step 402). The UE 18 can then determine a CQI index from the plurality of CQI indices to use as CSI feedback (step 404).

Also, additional embodiments that relate to the embodiments discussed in relation to FIG. 8 are included below in Appendices A and B.

A 4-bit CQI table is modified from the one in TS 36.213 and is shown in Table 3 below. In this table, CQI indices 7-15 are calculated assuming $R_{CQI}$ repetitions. In this example, $R_{ref}=R_{CQI}$, and $R_{CQI}$ is not shown explicitly in these CQI entries. CQI indices 1-6 in Table 3 correspond to where the number of PDSCH repetitions is $R_i$, where $R_i$ is one of the signaled repetition values (signaled by PDSCH-Rep-List). The code rate and spectral efficiency must therefore be scaled by $R_{CQI}/R_i$, as shown in the table for indices 1-6. In this case, $R_{ref}=R_i$, and $Rref \neq R_{CQI}$.

Note that Table 3 is shown for illustration only. It may be modified, or presented in another format, without deviating from the principle disclosed. In one example, the CQI entries are ordered in another order, e.g., CQI entries, (modulation, code rate, efficiency), corresponding to indices 1-6, are listed towards the bottom of the table instead.

TABLE 3

4-bit CQI Table

| CQI index | modulation | code rate × 1024 | efficiency |
|---|---|---|---|
| 0 | | out of range | |
| 1 | QPSK | 78 * $R_{CQI}/R_6$ | 0.1523 * $R_{CQI}/R_6$ |
| 2 | QPSK | 78 * $R_{CQI}/R_5$ | 0.1523 * $R_{CQI}/R_5$ |
| 3 | QPSK | 78 * $R_{CQI}/R_4$ | 0.1523 * $R_{CQI}/R_4$ |
| 4 | QPSK | 78 * $R_{CQI}/R_3$ | 0.1523 * $R_{CQI}/R_3$ |
| 5 | QPSK | 78 * $R_{CQI}/R_2$ | 0.1523 * $R_{CQI}/R_2$ |
| 6 | QPSK | 78 * $R_{CQI}/R_1$ | 0.1523 * $R_{CQI}/R_1$ |
| 7 | QPSK | 78 | 0.1523 |
| 8 | QPSK | 120 | 0.2344 |
| 9 | QPSK | 193 | 0.3770 |
| 10 | QPSK | 308 | 0.6016 |
| 11 | QPSK | 449 | 0.8770 |
| 12 | QPSK | 602 | 1.1758 |
| 13 | 16QAM | 378 | 1.4766 |
| 14 | 16QAM | 490 | 1.9141 |
| 15 | 16QAM | 616 | 2.4063 |

Using Table 3 above, both CE mode A and CE mode B can be easily supported using one table in some embodiments. The differences between CE mode A and CE mode B are taken care of via the different set of R; values in the table and the different $R_{CQI}$ value associated with the table.

For example, for CE mode A, $R_{set,A}=\{1,2,4,6,8,12,16,24\}$. Let $R_{CQI}=R_0=1$. The 4-bit CQI table of Table 3 is then shown in Table 4:

TABLE 4

4-bit CQI Table

| CQI index | modulation | code rate × 1024 | efficiency |
|---|---|---|---|
| 0 | | out of range | |
| 1 | QPSK | 78/16 | 0.1523/16 |
| 2 | QPSK | 78/12 | 0.1523/12 |
| 3 | QPSK | 78/8 | 0.1523/8 |
| 4 | QPSK | 78/6 | 0.1523/6 |
| 5 | QPSK | 78/4 | 0.1523/4 |
| 6 | QPSK | 78/2 | 0.1523/2 |
| 7 | QPSK | 78 | 0.1523 |
| 8 | QPSK | 120 | 0.2344 |
| 9 | QPSK | 193 | 0.3770 |
| 10 | QPSK | 308 | 0.6016 |
| 11 | QPSK | 449 | 0.8770 |
| 12 | QPSK | 602 | 1.1758 |
| 13 | 16QAM | 378 | 1.4766 |
| 14 | 16QAM | 490 | 1.9141 |
| 15 | 16QAM | 616 | 2.4063 |

For example, for CE mode B, $R_{set,B}=\{24,32,48,64,96,128,192,256\}$. Let $R_{CQI}=R_0=24$. In this example, the 4-bit CQI table of Table 3 is shown in Table 5:

TABLE 5

4-bit CQI Table

| CQI index | modulation | code rate × 1024 | efficiency |
|---|---|---|---|
| 0 | | out of range | |
| 1 | QPSK | 78/8 | 0.1523/16 |
| 2 | QPSK | 78 * 3/16 | 0.1523/12 |
| 3 | QPSK | 78/4 | 0.1523/8 |
| 4 | QPSK | 78 * 3/8 | 0.1523/6 |
| 5 | QPSK | 78/2 | 0.1523/4 |
| 6 | QPSK | 78 * 3/4 | 0.1523/2 |
| 7 | QPSK | 78 | 0.1523 |
| 8 | QPSK | 120 | 0.2344 |
| 9 | QPSK | 193 | 0.3770 |
| 10 | QPSK | 308 | 0.6016 |
| 11 | QPSK | 449 | 0.8770 |
| 12 | QPSK | 602 | 1.1758 |
| 13 | 16QAM | 378 | 1.4766 |
| 14 | 16QAM | 490 | 1.9141 |
| 15 | 16QAM | 616 | 2.4063 |

Figure 9:
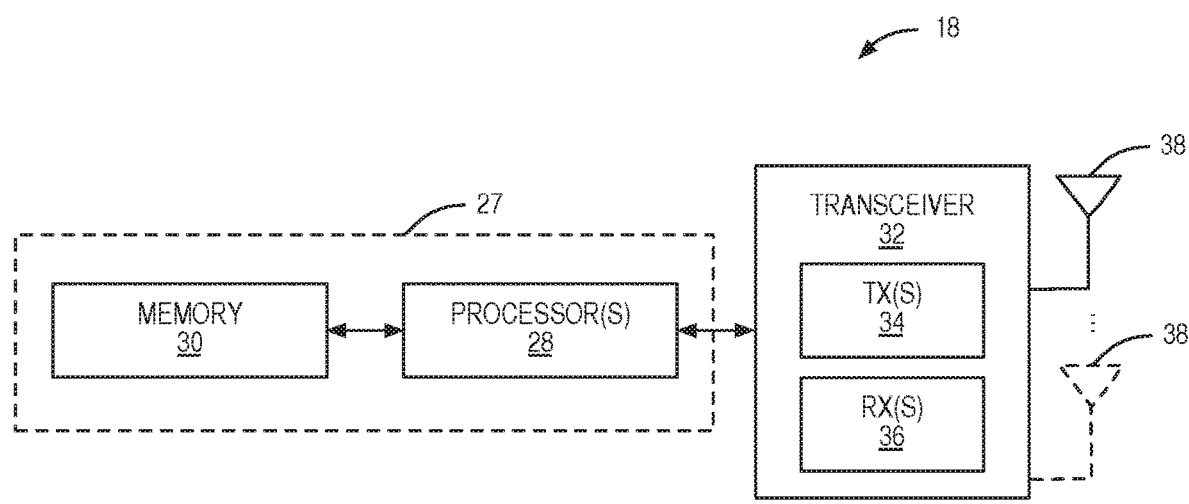
FIG. 9 is a block diagram of a UE according to some embodiments of the present disclosure.

FIG. 9 is a block diagram of the UE 18 (e.g., an MTC UE) according to some embodiments of the present disclosure. As illustrated, the UE 18 includes circuitry 27 including one or more processors 28 (e.g., one or more Central Processing Units (CPUs), one or more Application Specific Integrated Circuits (ASICs), one or more Field Programmable Gate Arrays (FPGAs), or the like, or any combination thereof) and memory 30. The UE 18 also includes one or more transceivers 32 including one or more transmitters 34 and one or more receivers 36 coupled to one or more antennas 38. In some embodiments, the functionality of the UE 18 described herein is implemented in software, which is stored in the memory 30 and executed by the processor(s) 28.

In some embodiments, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 10:
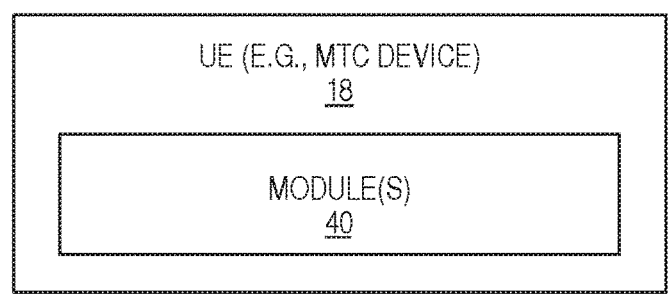
FIG. 10 is a block diagram of a UE according to some other embodiments of the present disclosure

FIG. 10 is a block diagram of the UE 18 (e.g., an MTC UE) according to some other embodiments of the present disclosure. As illustrated, the UE 18 includes one or more modules 40, each of which is implemented in software. The module(s) 40 operate to provide the functionality of the UE 18 according to any of the embodiments described above.

Figure 11:
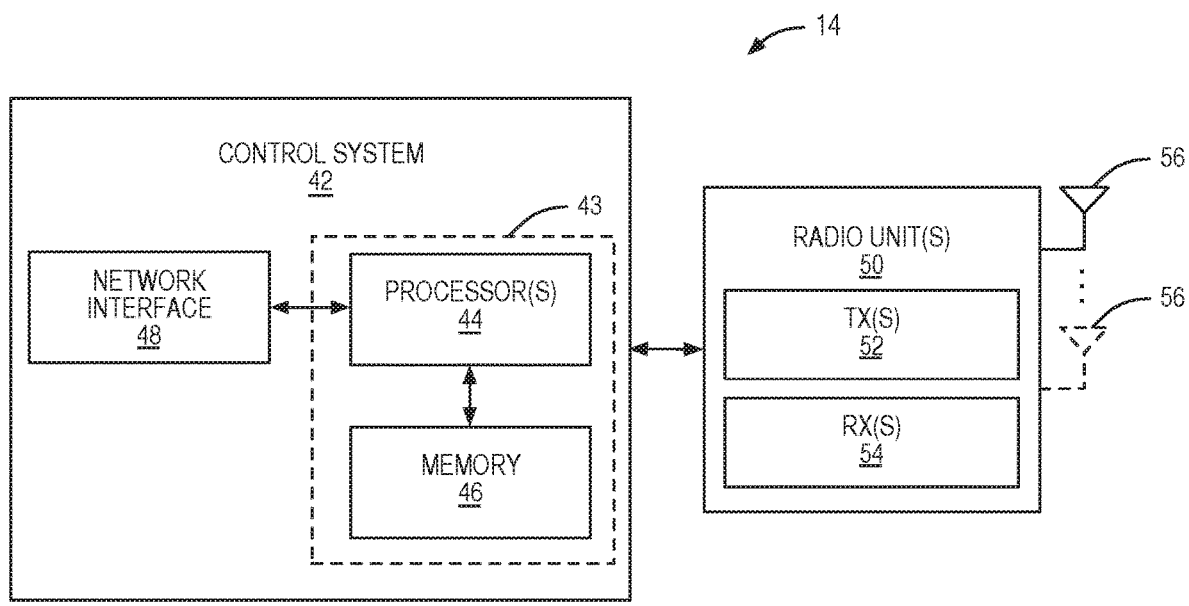
FIG. 11 is a block diagram of a network node according to some embodiments of the present disclosure.

FIG. 11 is a block diagram of a network node 14 (e.g., a base station) according to some embodiments of the present disclosure. As illustrated, the network node 14 includes a control system 42 (e.g., baseband unit) that includes circuitry 43 including one or more processors 44 (e.g., one or more CPUs, one or more ASICs, one or more FPGAs, and/or the like, or any combination thereof) and memory 46. The control system 42 also includes a network interface 48 (e.g., a network interface providing a connection to the core network and/or other network nodes). The network node 14 also includes one or more radio units 50 including one or more transmitters 52 and one or more receivers 54 connected to one or more antennas 56. In some embodiments, the functionality of the network node 14 described herein is implemented in software, which is stored in the memory 46 and executed by the processor(s) 44.

In some embodiments, a computer program including instructions which, when executed by at least one processor, cause the at least one processor to carry out the functionality of the network node 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 46).

Figure 12:
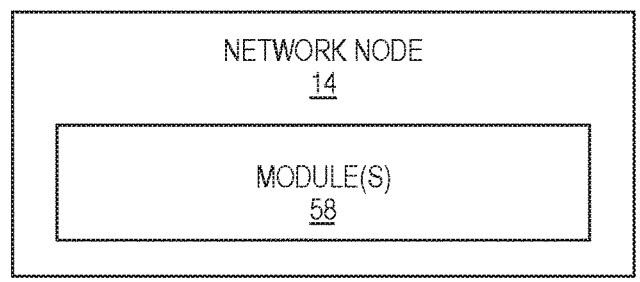
FIG. 12 is a block diagram of a network node according to some other embodiments of the present disclosure.

FIG. 12 is a block diagram of a network node 14 (e.g., a base station) according to some other embodiments of the present disclosure. As illustrated, the network node 14 includes one or more modules 58, each of which is implemented in software. The module(s) 58 operate to provide the functionality of the network node 14 according to any of the embodiments described above.

While various embodiments are described herein, some exemplary embodiments are as follows.

Embodiment 1

A method of determining channel feedback for a range extended physical channel, the method comprising:
receiving control signaling identifying at least one number of transmission repetitions; and
deriving channel feedback that satisfies the condition that the physical channel occupies a group of physical resources.

Embodiment 2

The method of embodiment 1 wherein the channel feedback is a CSI feedback, a CQI, or CSI comprising CQI.

Embodiment 3

The method of any of embodiments 1 and 2 wherein the at least one number of transmission repetitions identifies a number of repetitions that the physical channel will be transmitted with if the physical channel is transmitted.

Embodiment 4

The method of any of embodiments 1 through 3 wherein the group of physical resources is termed a CSI reference resource, wherein the CSI reference resource occupies a plurality of LTE subframes.

Embodiment 5

The method of any of embodiments 1 through 4 further comprising receiving control signaling identifying a frequency hopping pattern of the physical channel, and in the CSI reference resource assuming when deriving the CSI feedback that the frequency hopping pattern is used.

Embodiment 6

The method of embodiment 2, wherein:
the frequency hopping pattern identifies a set of PRBs that the physical channel will occupy if the physical channel is transmitted in a first subframe;
the set of PRBs is contiguous in frequency; and
the set of PRBs is different if the physical channel is transmitted in a second subframe.

Embodiment 7

The method of any of embodiments 1 through 3 wherein:
the CSI feedback comprises a CQI index selected from a plurality of CQI indices, where each of the plurality of CQI indices is associated with a number of PDSCH repetitions.

Embodiment 8

The method of embodiment 4, wherein at least two of the plurality of CQI indices have different PDSCH repetition values.

Embodiment 9

The method of embodiment 5 with one CQI definition table can be made for CE mode A, while another table is made for CE mode B.

Embodiment 10

The method of embodiment 5 where one CQI definition table is the table for each CE level, including a CQI table for no coverage enhancement.

Embodiment 11

The method of embodiment 1 wherein the CSI subframe sets are not applicable to an MTC UE.

Embodiment 12

The method of embodiment 1 wherein the CSI subframe sets are not applicable to MTC UE in CE mode B, but can be configured for UE in CE mode A.

Embodiment 13

The method of embodiment 1 wherein the eNB transmits repetitions of a PDSCH transport over both CSI subframe sets $C_{CSI,0}$ and $C_{CSI,1}$. At the receiving side, the UE processes repetitions over sets $C_{CSI,0}$ and $C_{CSI,1}$ differently, taking into account the different interference condition of the two sets.

Embodiment 14

The method of embodiment 1 wherein the repetitions of a given PDSCH transport are transmitted over subframes in a first CSI subframe set, where the repetitions skip the subframes in the other subframe set (i.e., the repetition is delayed to next available subframe in the first CSI subframe set).

Embodiment 15

The method of embodiment 1 wherein the UE uses a 6-PRB narrowband in a subframe for its reference resource, and the UE uses the same 6 PRBs in the subframe for M-PDCCH monitoring and/or PDSCH reception.

Embodiment 16

The method of embodiment 1 wherein the location of the 6-PRB narrowband is specifically defined for channel measurement purpose, for example, that associated with a measurement gap.

Embodiment 17

The method of embodiment 1 wherein the value of $R_{ref}$ can be fixed for all CQI values in the CQI table.

Embodiment 18

The method of embodiment 1 wherein the value of $R_{ref}$ may vary according to the CQI values in the CQI table.

Embodiment 19

The method of embodiment 1 wherein the value of $R_{CQI}$ can be an implicitly defined value that requires no additional signaling such as: a minimum number of repetitions in the repetition set associated with the UE's CE mode, i.e., $R_{0,A}$ for CE mode A, $R_{0,B}$ for CE mode B; a maximum number of repetitions in the repetition set associated with the UE's CE mode, i.e., $R_{m,A}$ for CE mode A, $R_{m,B}$ for CE mode B; a value in the middle of the repetition set associated with the UE's CE mode; the repetition level $R_{ref}$ associated with CSI reference resource, if $R_{ref}$ is not one of the values above (i.e., min, max, or middle value of the repetition set).

Embodiment 20

The method of embodiment 1 wherein value of $R_{CQI}$ is signalled in a dedicated manner.

Embodiment 21

A method for use in a wireless device for determining channel feedback for a channel comprising:
determining feedback for the channel over two or more subframes.

Embodiment 22

The method of embodiment 21 wherein the feedback is related to several subframes.

Embodiment 23

The method of any of embodiments 21 through 22 wherein the number of subframes is based on a number of transmission repetitions received by the device.

Embodiment 24

The method of any of embodiments 21 through 23 wherein the number of repetitions is received from the network.

Embodiment 25

The method of embodiment 24 wherein the number of repetitions is received from the network through control signaling.

Embodiment 26

The method of any of embodiments 21 through 25 wherein the channel feedback is CSI, CQI, or CSI comprising CQI.

Embodiment 27

The method of any of embodiments 21 through 26 wherein the channel is PDSCH and/or PDCCH.

Additional embodiments are included below and were originally in Appendix B of the provisional application. Any of those embodiments may be included in any suitable combination with the embodiments discussed herein and in relation to the Figures.

RAN1 #80 discussed CSI feedback for the Rel-13 work item on "Further LTE Physical Layer Enhancements for MTC" and agreed the following:
Note: the following bullets have no implication regarding the conditions for supporting aperiodic CSI:
FFS whether the CSI reference resource needs to be extended to more than one subframe in some cases.
When CSI reporting is supported, CSI reporting by low-cost and coverage-enhanced UEs is simplified by:
Not reporting RI;
Within a narrowband, all the RBs in the narrowband are assumed for reference measurement.
FFS: Existing CQI table is modified by introducing new or modified CQI entries for coverage-enhanced UEs:
New or modified CQI entries provide lower spectral efficiency values than currently available
The CSI reference resource is extended to span multiple subframes M (M>1) at least for UEs in small DL coverage enhancement:
FFS: M is semi-statically, UE-specifically, configured, or fixed;
FFS: if and how the extension is configured
FFS: Whether to use existing or updated CQI table
FFS: Entries are interpreted as corresponding to PDSCH reception over the multiple subframes M Here, remaining issues on channel state information (CSI) estimation and transmission for LC/CE UE are discussed.

Preferably, the number of subframes M (>1) that the CSI reference resource spans does not require signalling overhead. One method is to define a look-up table of M as a function of coverage enhancement level, or repetition level. Such a look-up table is specified in TS 36.213.

Proposal: The number of subframes M (>1) that CSI reference resource spans is predefined.

The aperiodic reporting is carried by the PUSCH data channel. Due to the reduced support of transmission modes, the existing reporting modes are reduced as follows:

Transmission mode 1: Modes 2-0, 3-0
Transmission mode 2: Modes 2-0, 3-0
Transmission mode 6: Modes 1-2, 2-2, 3-1, 3-2
Transmission mode 9: Modes 1-2, 2-2, 3-1, 3-2 if the UE is configured with PMI/RI reporting and number of CSI-RS ports>1; modes 2-0, 3-0 if the UE is configured without PMI/RI reporting or number of CSI-RS ports=1

When frequency hopping of PDSCH is disabled, the PDSCH stays at a 6-PRB narrowband for all repetitions across subframes. The associated M-PDCCH provides the location of the narrowband of the PDSCH.

The reporting modes degenerate to "wideband", where the wideband is equivalent to the provided 6-PRB narrowband only. Wideband is the same as subband, i.e., a 6 PRB narrowband in either case. There is no differentiation of "wideband", "UE selected (subband COI)" or "higher layer-configured (subband COD".

Specifically, for TM1, TM2: Modes 2-0, 3-0 become the same. They are both composed of a single 4-bit wideband CQI, and there is no PMI reporting. For TM1, TM2: Mode 2-0 is not supported, 3-0 is supported.

Specifically, for TM6, TM9: Modes 1-2, 2-2, 3-2 are no longer necessary. They can be removed for LC/CE UE. For TM6: only Mode 3-1 is kept for LC/CE UE. Mode 3-1 contains a subband CQI, which means a single CQI for the configured 6-PRB narrowband. Mode 3-1 also contains a single PMI, where the single PMI is the UE-preferred PMI across the 6-PRB narrowband. Preferably, the subband CQI differential is removed from Mode 3-1. As an alternative, the differential CQI field could be kept and filled with dummy bits, for example, all zeros. This maintains the existing reporting format, so that new transmit formats do not need to be introduced.

For TM9, if the UE is configured with PMI/RI reporting and the number of CSI-RS ports>1, only Mode 3-1 is supported, similar to TM6. Further, for TM9, mode 3-0 is supported in addition to mode 3-1 if the UE is configured without PMI/RI reporting or number of CSI-RS ports=1. In this case, eNB takes a guess on a precoder to use on DM-RS; this is applicable when reciprocity can be leveraged in TDD case where information for deriving precoder choice is available. Remove the subband CQI differential from Mode 3-0. As an alternative, the differential CQI field is kept and filled with dummy bits, for example, all zeros. This maintains the existing reporting format, so that new transmit formats do not need to be introduced. Subband size needs to be modified to be 6 PRB.

The same modes should be used as when frequency hopping is disabled. The only change is the reference resource: when frequency hopping is disabled, CSI is generated assuming one narrowband; when frequency hopping is enabled, CSI is generated assuming set of 6-PRB narrowbands configured by the frequency hopping pattern.

In summary, for LC/CE UE, the preferred way of operating aperiodic CSI reporting carried by PUSCH is:
For TM1, TM2: Mode 2-0 is not supported, 3-0 is supported.
For TM6: Modes 1-2, 2-2, 3-2 are not supported. Mode 3-1 is supported.
For TM9:
if the UE is configured with PMI/RI reporting and the number of CSI-RS ports>1: Modes 1-2, 2-2, 3-2 are not supported. Mode 3-1 is supported;
if the UE is configured without PMI/RI reporting or number of CSI-RS ports=1: Mode 2-0 is not supported, 3-0 is supported.

Due to the reduced support of transmission modes, the existing reporting modes for Periodic CSI are reduced as follows:

Transmission mode 1: Modes 1-0, 2-0
Transmission mode 2: Modes 1-0, 2-0
Transmission mode 6: Modes 1-1, 2-1
Transmission mode 9: Modes 1-1, 2-1 if the UE is configured with PMI/RI reporting and number of CSI-RS ports>1; modes 1-0, 2-0 if the UE is configured without PMI/RI reporting or number of CSI-RS ports=1.

When frequency hopping is disabled, the reporting modes degenerate to "wideband", which is equivalent to the provided 6-PRB narrowband only. "Wideband" mode is the same as "subband mode", i.e., a 6 PRB narrowband in either case. No differentiation of "wideband" and "UE selected".

For TM1, TM2: Modes 1-0 and 2-0 become the same. They are both composed of a single 4-bit wideband CQI. For example, only Mode 1-0 is adopted for a UE. Mode 1-0 contains a "wideband" CQI, which here means a single CQI for the configured 6-PRB narrowband.

For TM6: Support Mode 1-1 only. Mode 2-1 is not supported. Mode 1-1 contains a "wideband" CQI, which here means a single CQI for the configured 6-PRB narrowband. Mode 1-1 contains a single PMI, where the single PMI is the UE-preferred PMI across the 6-PRB narrowband.

TM9: Mode 1-1 only if the UE is configured with PMI/RI reporting and number of CSI-RS ports>1; Mode 1-0 only if the UE is configured without PMI/RI reporting or number of CSI-RS ports=1. Mode 1-1 is modified in similar as that of TM6, described above. Mode 1-0 contains a "wideband" CQI, which here means a single CQI for the configured 6-PRB narrowband.

When frequency hopping of PDSCH is enabled, the same modes should be used as when frequency hopping is disabled.

In summary, for LC/CE UE, the preferred way of operating periodic CSI reporting carried by PUCCH is:
Proposal:
For TM1, TM2: Mode 2-0 is not supported. Mode 1-0 is supported.
For TM6: Mode 2-1 is not supported; Mode 1-1 is supported.
For TM9:
if the UE is configured with PMI/RI reporting and number of CSI-RS ports>1: Mode 2-1 is not supported, Mode 1-1 is supported.
if the UE is configured without PMI/RI reporting or number of CSI-RS ports=1: Mode 2-0 is not supported, Mode 1-0 is supported For CQI range, since the Rel-13 LC/CE UE can operate in normal coverage and enhanced coverage, the proper modulation and coding rate range may vary dramatically depending on the amount of coverage enhancement. For normal coverage UE, the existing CQI table (without 256QAM) can continue to be used, as shown in Table 1 above.

In RAN1 and RAN4 discussion: Rel-13 low complexity UE supports only QPSK and 16QAM as modulation schemes for PDSCH.

Hence CQI indices 10-15, corresponding to 64-QAM as shown in Table 1, should be removed for Rel-13 low-complexity UE.

For enhanced coverage, a new CQI definition is also necessary. The higher-order modulation (16QAM and 64QAM) entries in the CQI table are no longer useful for a high-level of coverage enhancement. In this case, the CQI indices of 7-15 should be removed, which corresponds to the 16-QAM and 64-QAM modulation. A new set of entries of QPSK with low spectral efficiency can be added. To maintain the same 4-bit size of CQI definition, nine new entries can be added.

As an example, the new CQI index=1 is assumed to have spectral efficiency equivalent to 1/64 of the spectral efficiency of CQI index 0 in Table 1. Filling out other CQI entries of index 2-9, an example of CQI table for enhanced coverage is derived and shown in Table 6. The spectral efficiency of Table 6 is plotted together with that of Table 1 in FIG. 13. For clarity, FIG. 14 is zoomed in to show the lowest spectral efficiency entries of Table 6.

In Table 7, assuming the CQI definition in Table 6 is used, the number of repetitions in time is shown for K∈{152, 328, 504, 1000}, where K is the TB size. The assumptions are: 6 PRBs for DL transmission in a subframe, 3 OFDM symbols for the control region, and one antenna port.

With two sets of CQI tables defined, one configuration parameter $I_{coverage}$ can be defined to indicate if the UE is in normal coverage or enhanced coverage, and the UE and eNB then use the CQI definition correspondingly. In other words, the following procedure can be used: When $I_{coverage}$='normal', then the CQI is reported by UE, and interpreted by eNB, according to Table 1; when $I_{coverage}$='enhanced', then the CQI is reported by UE, and interpreted by eNB, according to Table 6.

Note that $I_{coverage}$ is not defined to support CQI only. Rather $I_{coverage}$ can be used as a high-level configuration parameter that affects many aspects of DL and UL operation. Hence, $I_{coverage}$ may not be considered overhead for CQI purpose.

Although the above discussion assumes two $I_{coverage}$ levels for simplicity of discussion, it is possible that more levels are defined. For example, four coverage levels can be defined: $I_{coverage}$∈{'normal', 'low-CE', 'medium-CE', 'large-CE'}, and each $I_{coverage}$ has its associated CQI table for interpretation of CQI index. For $I_{coverage}$='low-CE' and 'medium-CE', 16-QAM and 64-QAM may still be included.

Figure 13:
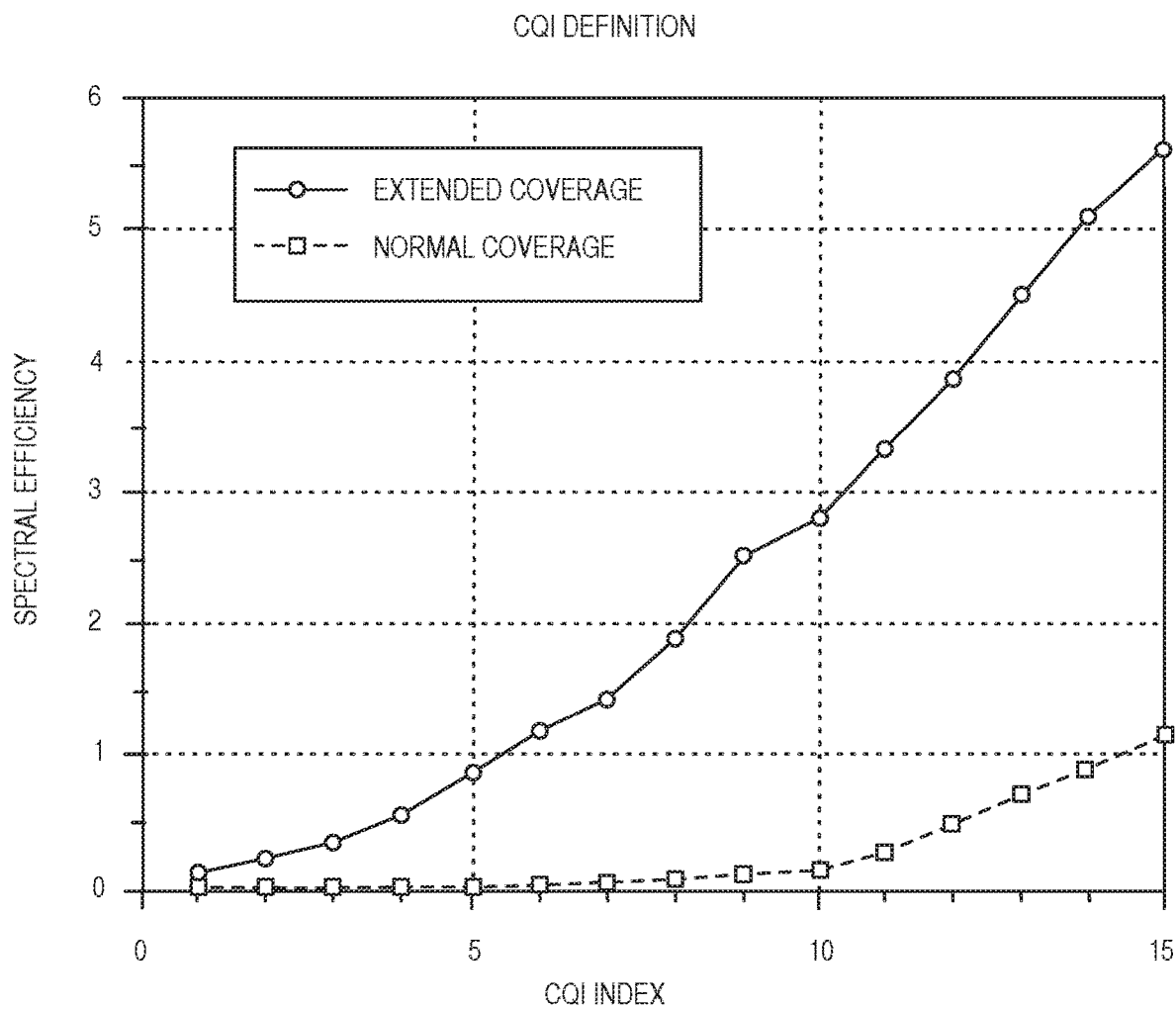
FIG. 13 illustrates the spectral efficiency defined in the 4-bit CQI tables for normal coverage and enhanced coverage.
Figure 14:
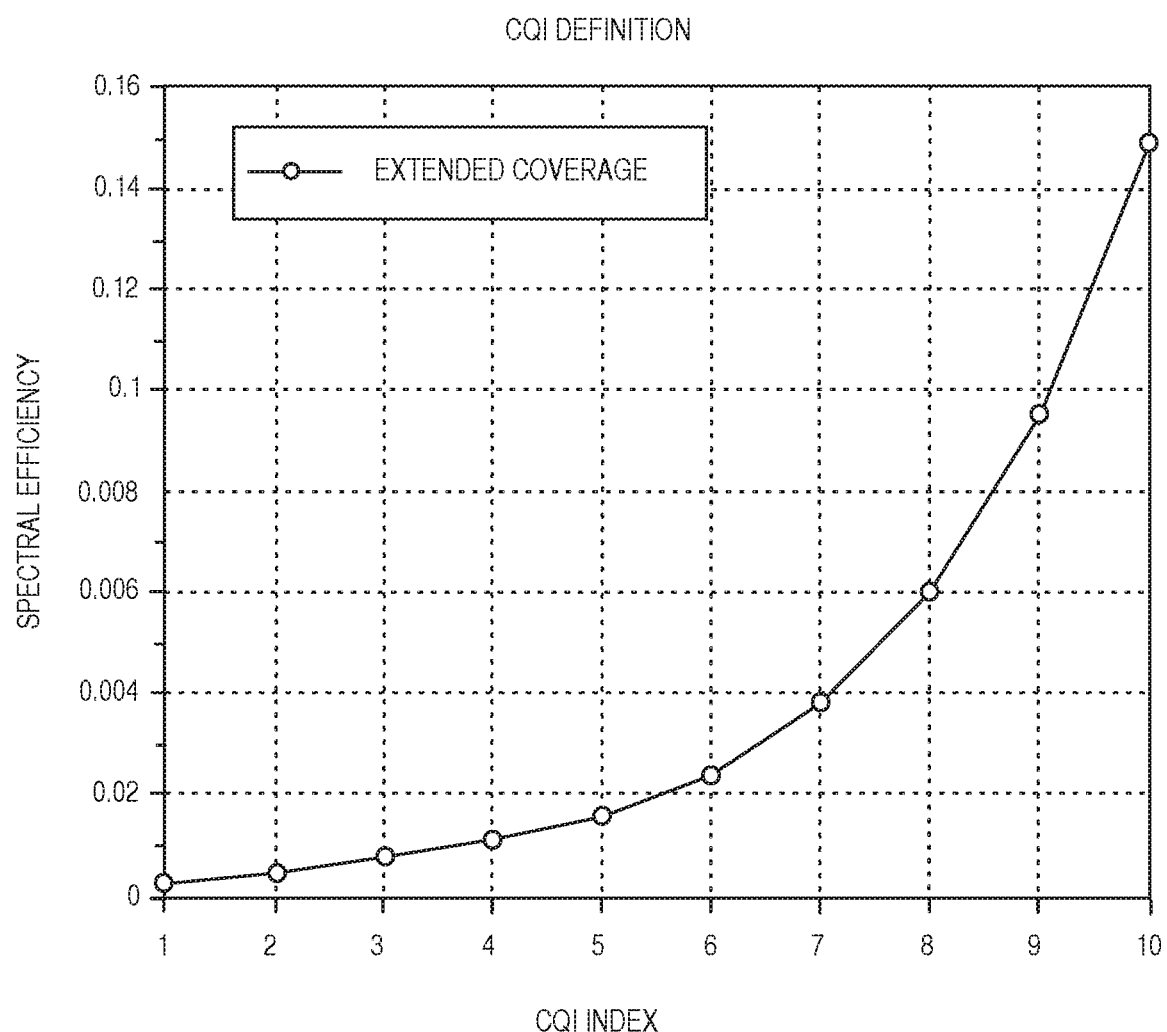
FIG. 14 illustrates the entries of low spectral efficiency defined in a new 4-bit CQI table for enhanced coverage.

FIG. 13 illustrates the spectral efficiency defined in the 4-bit CQI tables for normal coverage and enhanced coverage. FIG. 14 illustrates the entries of low spectral efficiency defined in the new 4-bit CQI table for enhanced coverage.

Proposals:

The existing CQI table is extended with new CQI entries for LC/CE UEs.

The new CQI entries support repetitions in time across multiple subframes.

TABLE 6

4-bit CQI Table for enhanced coverage

| CQI index | Modulation | code rate × 1024 | efficiency |
|---|---|---|---|
| 0 | | out of range | |
| 1 | QPSK | 1 | 0.0024 |
| 2 | QPSK | 2 | 0.0038 |
| 3 | QPSK | 3 | 0.0060 |
| 4 | QPSK | 5 | 0.0095 |
| 5 | QPSK | 8 | 0.0151 |
| 6 | QPSK | 12 | 0.0240 |
| 7 | QPSK | 19 | 0.0381 |
| 8 | QPSK | 31 | 0.0604 |
| 9 | QPSK | 49 | 0.0959 |
| 10 | QPSK | 78 | 0.1523 |
| 11 | QPSK | 120 | 0.2344 |
| 12 | QPSK | 193 | 0.3770 |
| 13 | QPSK | 308 | 0.6016 |
| 14 | QPSK | 449 | 0.8770 |
| 15 | QPSK | 602 | 1.1758 |

TABLE 7

Number of repetitions corresponding to new CQI indices of 1-9 for enhanced coverage. Assumption: 6 PRBs with number of TB bits K ∈ {152, 328, 504, 1000}

| CQI index | efficiency | # repetition | | | |
|---|---|---|---|---|---|
| | | K = 152 | K = 328 | K = 504 | K = 1000 |
| 1 | 0.0024 | 84 | 182 | 280 | 556 |
| 2 | 0.0038 | 53 | 115 | 178 | 350 |
| 3 | 0.0060 | 34 | 72 | 111 | 221 |
| 4 | 0.0095 | 21 | 46 | 70 | 139 |
| 5 | 0.0151 | 13 | 29 | 44 | 88 |
| 6 | 0.0240 | 8 | 18 | 28 | 55 |
| 7 | 0.0381 | 5 | 11 | 18 | 35 |
| 8 | 0.0604 | 3 | 7 | 11 | 22 |
| 9 | 0.0959 | 2 | 5 | 7 | 14 |
| 10 | 0.1523 | 1 | 3 | 4 | 9 |

The following acronyms are used throughout this disclosure.

| | |
|---|---|
| 3GPP | 3rd Generation Partnership Project |
| ASIC | Application Specific Integrated Circuit |
| CE | Coverage Enhancement |
| CPE | Customer Premises Equipment |
| CPU | Central Processing Unit |
| CQI | Channel Quality Indicator |
| CSI | Channel State Information |
| D2D | Device-to-Device |
| DCI | Downlink Control Information |
| DFT | Discrete Fourier Transform |
| DL | Downlink |
| eNB | Enhanced Node-B |
| E-UTRAN | Evolved UMTS Radio Access Network |
| EPC | Evolved Packet Core |
| EPDCCH | Enhanced Physical Downlink Control Channel |
| FPGA | Field Programmable Gate Array |
| HARQ | Hybrid Automatic Repeat Request |
| IoT | Internet of Things |
| LC/CE | Low-Complexity/Coverage Enhancement |
| LEE | Laptop Embedded Equipment |
| LME | Laptop Mounted Equipment |
| LTE | Long Term Evolution |
| M2M | Machine-to-Machine |
| MBMS | Multimedia Broadcast/Multicast Service |
| MCE | Multi-cell/Multicast Coordination Entity |
| MCS | Modulation and Coding Scheme |
| MDT | Minimization of Drive Test |
| MME | Mobility Management Entity |
| M-PDCCH | MTC Physical Downlink Control Channel |
| MTC | Machine-Type Communication |

-continued

| | |
|---|---|
| OFDM | Orthogonal Frequency Division Multiplexing |
| PDN | Packet Data Network |
| P-GW | PDN Gateway |
| PBCH | Physical Broadcast Channel |
| PDCCH | Physical Downlink Control Channel |
| PDN | Packet Data Network |
| PDSCH | Physical Downlink Shared Channel |
| PMI | Precoding Matrix Index |
| PRB | Physical Resource Block |
| QPSK | Quadrature Phase Shift Keying |
| RAN | Radio Access Node |
| RRC | Radio Resource Control |
| RRH | Remote Radio Head |
| RRU | Remote Radio Unit |
| RV | Redundancy Version |
| S-GW | Serving Gateway |
| TB | Transmission Block |
| TCE | Trace Collection Entity |
| TM | Transmission Mode |
| TTI | Transmission Time Interval |
| UE | User Equipment |
| UL | Uplink |
| UMTS | Universal Mobile Telecommunications System |
| USB | Universal Serial Bus |

Those skilled in the art will recognize improvements and modifications to the embodiments of the present disclosure. All such improvements and modifications are considered within the scope of the concepts disclosed herein.

What is claimed is:

1. A method for use in a wireless device of determining channel feedback for a physical channel, comprising:
   receiving, from a network node, control signaling comprising an indication of a number of transmission repetitions of the physical channel;
   receiving, from the network node, control signaling comprising an indication of a frequency hopping pattern of the physical channel where the frequency hopping pattern identifies a set of Physical Resource Blocks, PRBs, that the physical channel will occupy if the physical channel is transmitted in a first subframe and which identifies at least in part a group of physical resources to be used to derive the channel feedback; and
   deriving the channel feedback for the physical channel based on the indication of the number of transmission repetitions assuming that the frequency hopping pattern is used, where a code rate corresponding to the channel feedback corresponds to an effective channel code rate of the physical channel occupying a group of physical resources comprising the number of transmission repetitions.

2. The method of claim 1 further comprising:
   reporting, to the network node, the channel feedback for the physical channel.

3. The method of claim 1 wherein the group of physical resources is termed a Channel State Information, CSI, reference resource, wherein the CSI reference resource occupies a plurality of subframes.

4. The method of claim 1, wherein:
   the set of PRBs is contiguous in frequency; and
   the set of PRBs is different if the physical channel is transmitted in a second subframe.

5. The method of claim 1 wherein:
   Channel State Information, CSI, feedback comprises a Channel Quality Indication, CQI, index selected from a plurality of CQI indices, where each of the plurality of CQI indices is associated with the number of transmission repetitions of the physical channel.

6. The method of claim 5 wherein the plurality of CQI indices composes a first CQI definition table for the number of transmission repetitions of the physical channel and a second CQI definition table comprises a second plurality of CQI indices for a second number of transmission repetitions of the physical channel.

7. The method of claim 1 wherein the number of transmission repetitions of the physical channel is not applicable to a Machine-Type Communication, MTC, User Equipment, UE, in Coverage Enhancement, CE, mode B, but can be configured for a UE in CE mode A.

8. The method of claim 1 wherein the transmission repetitions of the physical channel are transmitted over subframes in a first Channel State Information, CSI, subframe set, where the transmission repetitions skip subframes not in the first CSI subframe set.

9. The method of claim 1 wherein the group of physical resources is a 6-PRB narrowband in a subframe that is also used for Machine-Type Communication, MTC, Physical Downlink Control Channel, M-PDCCH, monitoring and/or the physical channel reception.

10. The method of claim 5 wherein the number of transmission repetitions of the physical channel is chosen from the group consisting of: fixed for all CQI values in the plurality of CQI indices; and the value of the number of transmission repetitions is signaled in a dedicated manner.

11. A User Equipment, UE, comprising:
    circuitry comprising one or more processors and a memory containing instructions whereby the UE is configured to:
       receive, from a network node, control signaling comprising an indication of a number of transmission repetitions of a physical channel;
       receive, from the network node, control signaling comprising an indication of a frequency hopping pattern of the physical channel where the frequency hopping pattern identifies a set of Physical Resource Blocks, PRBs, that the physical channel will occupy if the physical channel is transmitted in a first subframe and which identifies at least in part a group of physical resources to be used to derive channel feedback; and
       derive the channel feedback for the physical channel based on the indication of the number of transmission repetitions assuming that the frequency hopping pattern is used, where a code rate corresponding to the channel feedback corresponds to an effective channel code rate of the physical channel occupying a group of physical resources comprising the number of transmission repetitions.

12. A method for use in a network node for receiving channel feedback for a physical channel, comprising:
    transmitting, to a wireless device, control signaling comprising an indication of a number of transmission repetitions of the physical channel to a wireless device;
    transmitting, to the wireless device, control signaling comprising an indication of a frequency hopping pattern of the physical channel where the frequency hopping pattern identifies a set of Physical Resource Blocks, PRBs, that the physical channel will occupy if the physical channel is transmitted in a first subframe and which identifies at least in part a group of physical resources to be used to derive the channel feedback; and
    receiving, from the wireless device, the channel feedback for the physical channel where a code rate corresponding to the channel feedback corresponds to an effective channel code rate of the physical channel occupying a group of physical resources comprising the number of transmission repetitions.

13. The method of claim 12 wherein the group of physical resources is termed a Channel State Information, CSI reference resource, wherein the CSI reference resource occupies a plurality of subframes.

14. The method of claim 12, wherein:
the set of PRBs is contiguous in frequency; and
the set of PRBs is different if the physical channel is transmitted in a second subframe.

15. The method of claim 12 wherein:
Channel State Information, CSI, feedback comprises a Channel Quality Indication, CQI, index selected from a plurality of CQI indices, where each of the plurality of CQI indices is associated with the number of transmission repetitions of the physical channel.

16. The method of claim 15 wherein the plurality of CQI indices composes a first CQI definition table for the number of transmission repetitions of the physical channel and a second CQI definition table comprises a second plurality of CQI indices for a second number of transmission repetitions of the physical channel.

17. The method of claim 12 wherein the number of transmission repetitions of the physical channel is not applicable to a Machine-Type Communication, MTC, User Equipment, UE, in Coverage Enhancement, CE, mode B, but can be configured for a UE in CE mode A.

18. The method of claim 12 wherein the transmission repetitions of the physical channel are transmitted over subframes in a first Channel State Information, CSI, subframe set, where the transmission repetitions skip subframes not in the first CSI subframe set.

19. The method of claim 12 wherein the group of physical resources is a 6-PRB narrowband in a subframe that is also used for Machine-Type Communication, MTC, Physical Downlink Control Channel, M-PDCCH, monitoring and/or the physical channel reception.

20. The method of claim 15 wherein the number of transmission repetitions of the physical channel is chosen from the group consisting of: fixed for all CQI values in the plurality of CQI indices; and the value of the number of transmission repetitions is signaled in a dedicated manner.

\* \* \* \* \*